June 28, 1960  L. M. FUREY  2,942,702
ADJUSTABLE APPARATUS FOR SHIFTING AND STOWING CARGO
Filed March 2, 1956  2 Sheets-Sheet 1
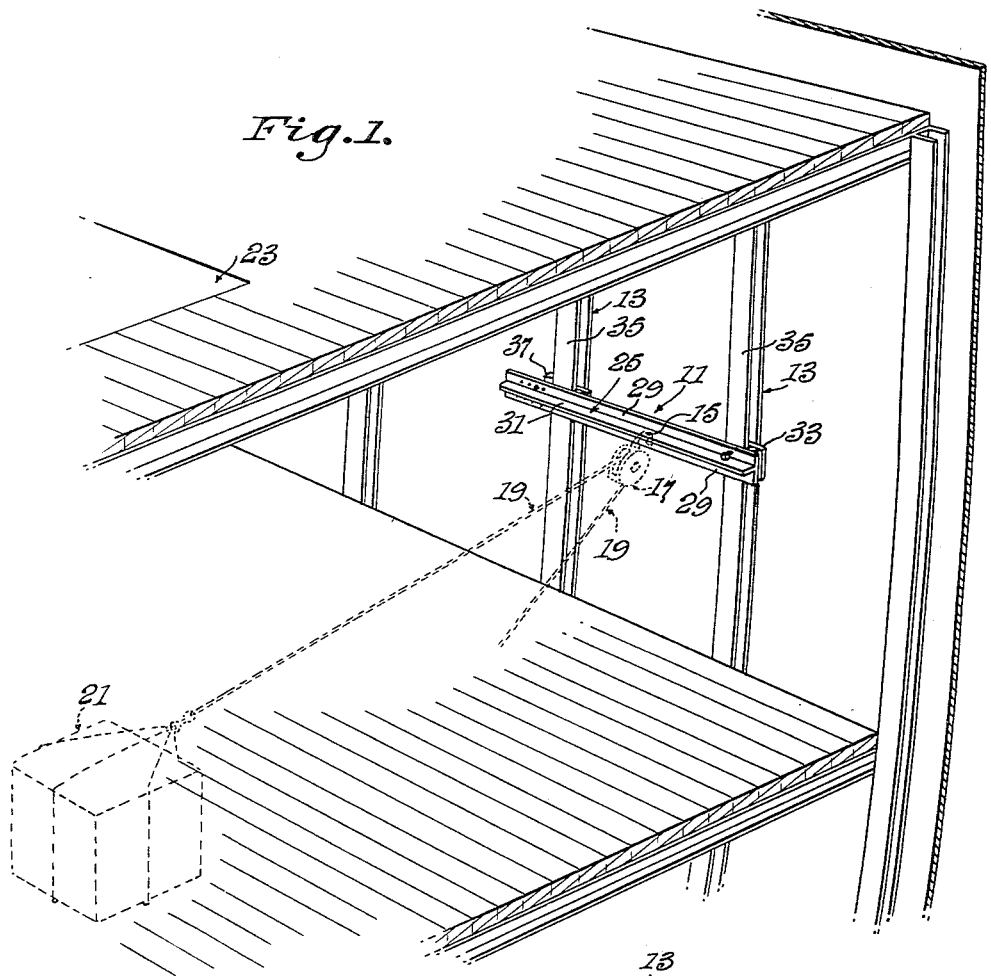
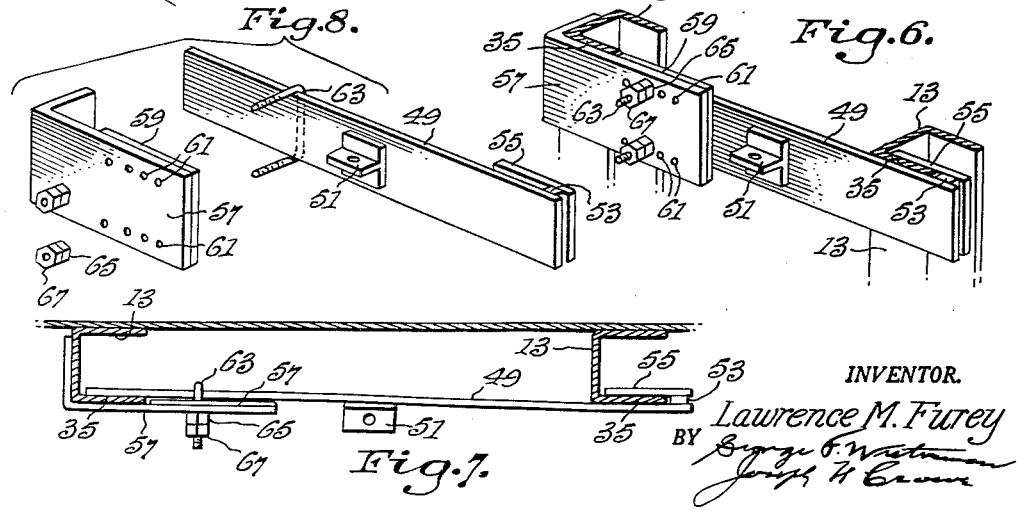
INVENTOR.
Lawrence M. Furey
BY
ATTORNEYS June 28, 1960    L. M. FUREY    2,942,702
ADJUSTABLE APPARATUS FOR SHIFTING AND STOWING CARGO
Filed March 2, 1956    2 Sheets-Sheet 2
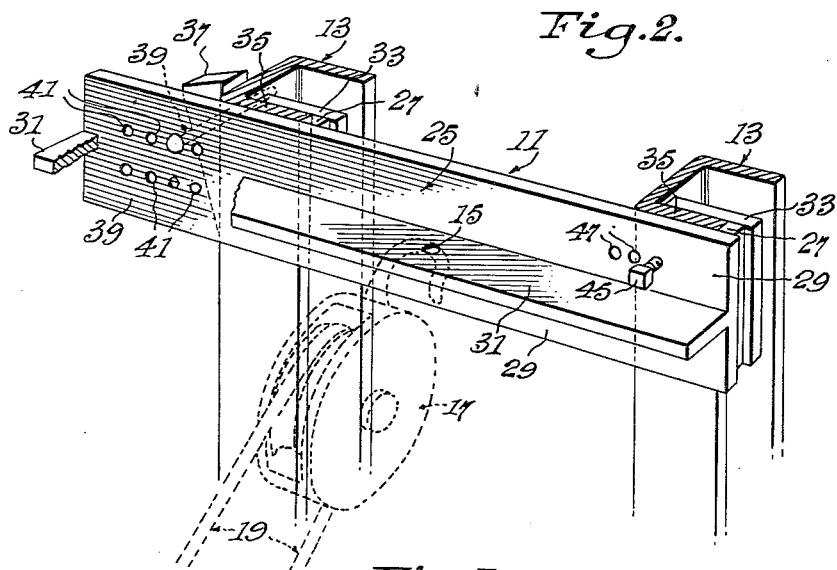
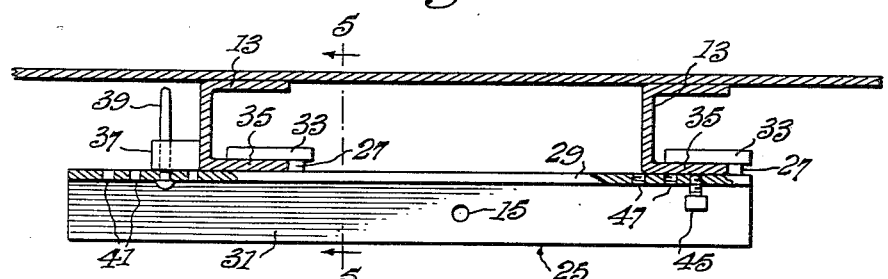
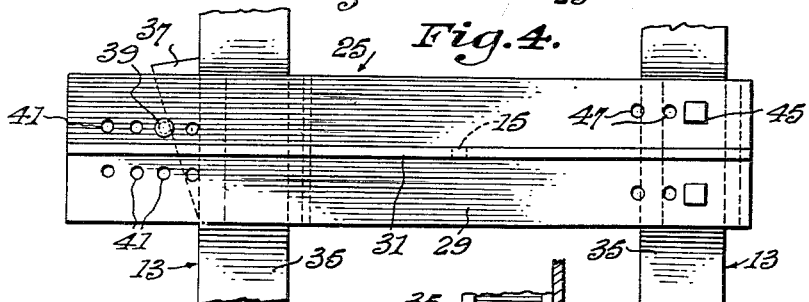
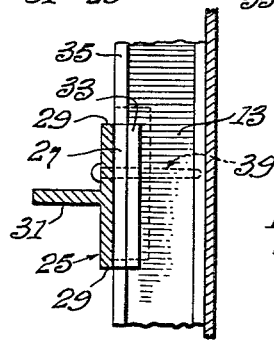
INVENTOR.
Lawrence M. Furey
BY
ATTORNEYS

2,942,702

ADJUSTABLE APPARATUS FOR SHIFTING AND STOWING CARGO

Lawrence M. Furey, Warwick, Va., assignor to the United States of America as represented by the Secretary of the Army Filed Mar. 2, 1956, Ser. No. 569,212

1 Claim. (Cl. 189—37)

(Granted under Title 35, U.S. Code (1952), sec. 266)

The invention described herein may be manufactured and used by or for the Government for governmental purposes without the payment of any royalty thereon.

The present invention relates generically to cargo handling equipment and more specifically it is directed to an apparatus detachably and adjustably associated with the ribs of a vessel to support a block and tackle or similar cargo handling device for shifting and stowing cargo either above or below decks of the vessel.

The cargo and materials carried by vessels are usually stowed below decks, although occasionally some cargo is carried above decks. When cargo is stowed below decks it is customarily lowered to the floor of a lower deck through one of several hatchways located at strategic sites on the main deck. If heavy shipments are involved, the cargo is lowered through the hatchway to the floor of the lower deck by means of pulleys and ropes or cables worked by winches. After the articles of cargo have been deposited on the floor of the deck, they must be manually moved by workmen with mechanical aids, such as levers, rollers, or trucks, to the wings or sides of the vessel's hold adjacent to the hatchway. The work of securely stowing heavy cargo underneath the decks necessarily involves a great deal of difficult, heavy manual labor.

Past efforts to overcome the burdensome labor involved the use of a single beam clamp attached to one of the beams or ribs of the vessel to support a cargo handling device, such as a block and tackle. However, the single beam clamp method of supporting a cargo handling device has proved generally unsatisfactory in practice, since this method frequently tends to place too much stress on one rib of the vessel and often results in deformation and weakening of the rib.

It is an object of the present invention to provide a readily adjustable and detachable apparatus to securely and safely support a cargo handling device on two adjacent ribs of a vessel for shifting and stowing caro.

It is another object of this invention to provide an apparatus to support a cargo handling device on two adjacent ribs of a vessel and distribute the load of the cargo evenly between the two ribs, thus overcoming the primary disadvantage of the single beam clamp method, viz, concentration of the entire stress of the load on one rib of the vessel.

It is a further object of the present invention to provide an apparatus which supports a cargo handling device on two adjacent ribs of a ship and which has clamping means to permit ready adjustment of the apparatus for rapid attachment to or detachment from ribs of varying dimensions and distances apart.

The invention will be understood more thoroughly by reference to the accompanying drawings in which corresponding parts are indicated by similar reference characters. Referring to the drawings:

Fig. 1 is a cutaway view of the hold of a vessel, partially in elevation, and showing the apparatus attached to two ribs of the vessel in position for supporting a cargo handling device;

Fig. 2 is a detailed perspective view of a preferred embodiment of the apparatus comprising the present invention and showing a snatch block supported by the apparatus and depicted in broken lines;

Fig. 3 is a horizontal section of the apparatus shown in Fig. 2;

Fig. 4 is a front elevation thereof;

Fig. 5 is a detailed vertical section taken on the line 5—5 of Fig. 3;

Fig. 6 is a perspective view illustrative of a modified form of the apparatus;

Fig. 7 is a plan view thereof partially in section; and

Fig. 8 is a disassembled perspective view thereof.

In one embodiment of the apparatus 11 illustrated (Fig. 1), the apparatus is made up from a T-beam and has a hole 15 drilled in the web thereof to receive a snatch block or pulley 17 for the engaging of wire cables 19 for pulling heavy objects of cargo 21 into the wings of the vessel's hold, fore or aft of the square of the hatch 23.

Fig. 2 shows a detailed perspective view of the preferred embodiment of the apparatus 11 constructed from a T-beam 25. Two symmetrical spacer blocks 27 are rigidly attached by a weld or other means to the T-beam flange 29 on the opposite side from the web 31 as shown. Two symmetrical holding plates 33 are attached to the spacer blocks 27 so that they stand in a plane parallel to that of the T-beam flange 29. The integral combination of spacers 27 and plates 33 form two rigid hooks attached to the beam 29 with the plates extending in a common direction. The dimensions of the spacer blocks 27 are such that the distance between the holding plates 33 and the flange 29 is equal to the thickness of the protruding leg 35 of the ship's channel beam rib 13. This construction permits the angular structure formed by the spacer blocks 27 and holding plates 33 to act as hooks to slide over the interior legs 35 of the ship's channel beam ribs and hold the T-beam 25 snugly against the ribs 13.

One end of the apparatus 11 is locked in position by means of clamping or securing means including a wedge 37 and an adjustable bar 39. The bar 39 can be located in any of several holes 41 drilled in the flanges 29 of one end of the apparatus depending on the distance between adjacent ribs of the ship. The bar 39 is placed in one of the holes 41 that will enable the plate 33 to slide behind the legs 35 of the channel beam ribs and still leave room for the wedge 37 to be driven down tightly between the web of the channel beam 13 and the adjustable bar 39 to hold the apparatus 11 firmly in place substantially as shown. The other end of the apparatus 11 may be held in place by a set screw 45 which is screwed in tightly against the leg 35 of the channel beam rib 13 through the appropriate one of several threaded holes 47. The apparatus 11 can be quickly and easily adjusted for vertical position on the channel beam ribs 13 or moved to a new set of adjacent ribs by merely removing the wedge 37 and loosening the set screw 45.

Fig. 6 shows a further embodiment of the invention in which an alternative means for clamping to the channel beam ribs 13 and an alternative means for anchoring the snatch block to the apparatus are disclosed. The main member 49 of this embodiment of the apparatus is formed from a steel plate. Firmly attached to this plate by weld or other means is an apertured plate 51 for receiving and holding cargo handling equipment, a spacer block 53, and holding plate 55 at one end similar to those shown in the first embodiment of the invention, Fig. 2 at 27 and 33.

In operation, the angle formed by the spacer block 53 and holding plate 55 slides onto the leg 35 of the channel beam rib while the main member 49 is sprung back so that it is placed behind the leg 35 of the channel beam rib 13. An angle holding clamp assembly consisting of an L-shaped steel plate 57 and spacer block 59, larger in width than the main member 49, is placed over the channel beam rib 13 with the L-shape of the channel beam rib 13 fitting inside the L-shaped steel plate 57, and the spacer block 59 abutting against the face of the main member 49. A series of holes 61 are drilled through the spacer block 59 and L-shaped steel plate 57 to receive the legs of a U bolt 63 which is firmly attached to or placed over the main member 49 and then through the set of holes 61 which will yield the best position of the bolt for secure clamping of the main member 49 to the channel beam rib 13. The legs of the U bolt 63 are threaded to receive a combination of an unthreaded nut 65, which acts as a washer, and a threaded nut 67 on each leg to lock the U bolt 63 in position. For best results the spacer block 59 can be smaller in thickness than the leg 35 of the channel beam rib 13 so that when the U bolt 63 is drawn up tightly the main member 49 will be very securely clamped against the back of the leg 35 of the channel beam rib 13.

While the form of the invention illustrated and described represents the preferred embodiment, it will be understood that this is intended to be an illustrative embodiment only and does not constitute an inflexible description and illustration of the invention, as obviously various changes in structural detail may be made by one skilled in the art as may be dictated by the particular use or applicability of the construction, which changes in structure and details would be apparent to one skilled in this art. It will be understood accordingly, that it is intended to embrace within the scope of the invention such modifications and changes as would be necessary to adapt the invention to varying conditions and uses as defined by the appended claim.

Having thus described my invention, what I claim as new and wish to secure by Letters Patent is:

A device for attaching a pulling implement to a pair of parallel ribs in the hold of a ship, each of said ribs having a flange portion extending from a web portion, said flange portions of both ribs extending in a common direction and lying substantially in the same plane, said device comprising an elongated beam, a first hook rigidly connected adjacent a first end of said beam, a second hook rigidly connected to said beam at a point spaced from the second end of said beam, each of said hooks having a spacer portion disposed perpendicular to said beam and rigidly connected thereto and a hook plate portion connected to said spacer portion and extending substantially parallel to said beam, both said hook plates extending toward said second end of said beam, said hooks being spaced one from the other and said plate portion being of sufficient length so that when one of said hook spacer portions engages one of said rib flange portions each of said hook plate portions will engage one of the rib flange portions, wedge means adjustably attached to said beam adjacent said second end for wedging against a rib flange portion received in said second hook and holding one of said hook spacer portions against the edge of the rib flange portion received in that hook, and means for attaching a pulling implement to said beam.

References Cited in the file of this patent

UNITED STATES PATENTS

| | | |
|---|---|---|
| 2,494,953 | Martin | Jan. 17, 1950 |
| 2,609,582 | Kindorf et al. | Sept. 9, 1952 |

FOREIGN PATENTS

| | | |
|---|---|---|
| 676,138 | Great Britain | July 23, 1952 |
| 520,203 | Belgium | June 15, 1953 |
| 1,053,420 | France | Sept. 30, 1953 |
| 919,523 | Germany | Oct. 25, 1954 |